No. 738,052. PATENTED SEPT. 1, 1903.
B. B. MOSS.
NUT LOCK.
APPLICATION FILED JUNE 22, 1903.
NO MODEL.

Witnesses
M. E. Corder
A. R. Walton

Inventor
Bertie B. Moss
by Milo B. Stevens & Co
Attorneys

No. 738,052. Patented September 1, 1903.

UNITED STATES PATENT OFFICE.

BERTIE B. MOSS, OF PEKIN, INDIANA.

NUT-LOCK.

SPECIFICATION forming part of Letters Patent No. 738,052, dated September 1, 1903.

Application filed June 22, 1903. Serial No. 162,617. (No model.)

*To all whom it may concern:*

Be it known that I, BERTIE B. MOSS, a citizen of the United States, residing at Pekin, in the county of Washington and State of Indiana, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

The object of this invention is to produce a nut-lock which will serve to lock the nuts and bind the bolts of the joints of railroad-rails. In addition to a washer having a tongue which turns down over the nut it includes a washer-plate which is jammed between the base of the fish-plate and the bolt and which serves to bind the bolt tightly against the top of the hole in the fish-plate. I have found that the loosening of the bolts of railway-joints is chiefly caused by the up-and-down motion of the bolts and resulting wear of the fish-plate and nut due to vibration caused by the passage of trains.

Figure 2:
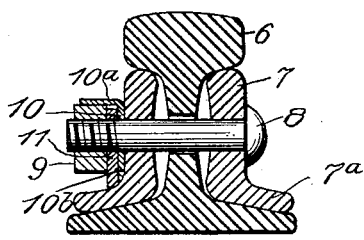
Figure 1:
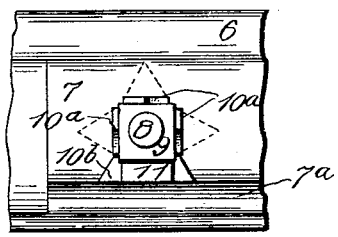

In the accompanying drawings, Figure 1 is a side elevation of the invention as applied to a rail-joint, and Fig. 2 is a vertical cross-section thereof.

Referring specifically to the drawings, 6 indicates the rail, and 7 the fish-plates, which have bottom flanges 7ª, which overlie the base of the rail.

8 indicates the bolt through the rail and fish-plate, and 9 the nut thereon.

At 10 is a thin flexible nut-lock washer having a series of tongues 10ª, which may be bent down upon the side of the nut to prevent the same from turning. To prevent the washer from turning, its base portion 10ᵇ is squared or cut off straight to fit against the flange of the fish-plate, so that it can not be turned on the bolt. Between said washer and the nut is another heavy, thick, and rigid washer-plate 11, the object of which is to jam the bolt against the top of the bolt-hole through the fish-plate and to prevent any relative movement between the bolt and the fish-plate. The lower end of this plate 11 bears against the flange of the fish-plate, and it is cut of such length that it produces a tight bind and upward pressure against the bolt when it is jammed in between the flange of the fish-plate and the bolt. In other words, it lifts and strains the bolt upwardly against the top of the bolt-hole in the fish-plate. The nut holds this washer in place, and as long as the nut is on the fish-plate and bolt are firmly bound together and relative movement or vibration thereof is prevented. Such movement is what produces wear and loosening of the nut, and the avoidance thereof is advantageous.

What I claim as new, and desire to secure by Letters Patent, is—

1. The combination with the bolt, nut, and fish-plate having a flange at the lower edge, of a rigid washer-plate on the bolt under the nut slightly longer than the distance from the bolt-hole to the flange, so that it is jammed between the flange and the bolt, and means to lock the nut.

2. The combination with the bolt, nut, and fish-plate having a flange at the lower edge, of a rigid washer-plate on the bolt under the nut slightly longer than the distance from the bolt-hole to the flange, so that it is jammed between the flange and the bolt, and a flexible non-rotatable washer on the bolt having a locking-tongue bent against the side of the nut.

In testimony whereof I affix my signature in presence of two witnesses.

BERTIE B. MOSS.

Witnesses:
 DELLA G. MCKINLEY,
 EMMA MCKINLEY.